Figure 1:
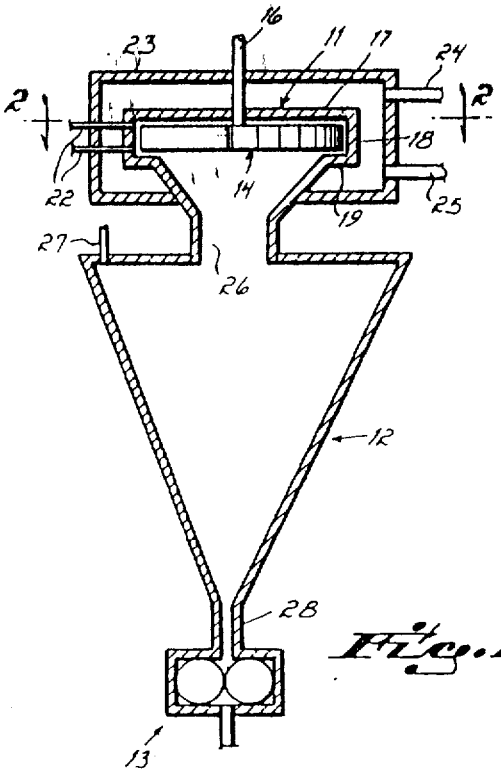
Figure 2:
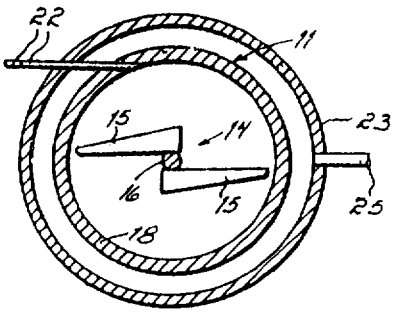
Figure 3:
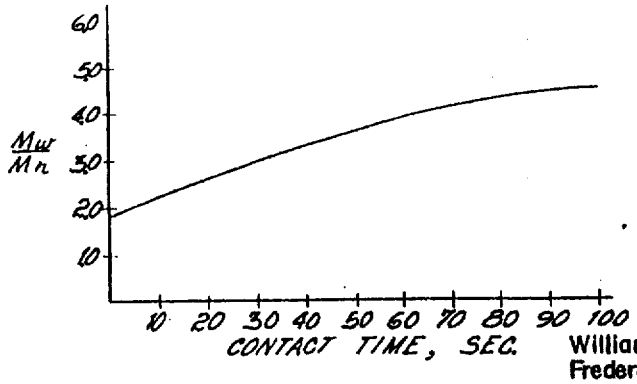

SR

C111A XR T 864,005

T 864005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 80 cents per sheet.

Applications published under the Defensive Publication Program have not been examined as to the merits of alleged invention. The Patent Office makes no assertion as to the novelty of the disclosed subject matter.

PUBLISHED JULY 15, 1969

864 O.G. 729

777,420

METHOD AND APPARATUS FOR CONTINUOUSLY PRODUCING SPINNING DOPES OF SPANDEX POLYMERS

William M. McSpadden, Jr., and Frederick W. Voigt, Jr., both of P.O. Box 511, Kingsport, Tenn. 37662

Filed Nov. 20, 1968. Published July 15, 1969

Int. Cl. C08g *35/00, 22/04*

U.S. Cl. 260—77.5

1 Sheet Drawing. 19 Pages Specification

A method for continuously producing, in dope form, a spandex polymer having a relatively low *Mw/Mn* ratio including the steps of (1) initially preparing independent reactant solutions of the spandex prepolymer and the chain extender; (2) introducing the separate reactant solutions in a continuous manner to a mixing area; (3) intimately, rapidly and continuously mixing the reactant solutions in the mixing area; (4) flowing the mixed reactant solutions from the mixing area to a holdup area prior to the spandex reaction becoming more than 75% com-

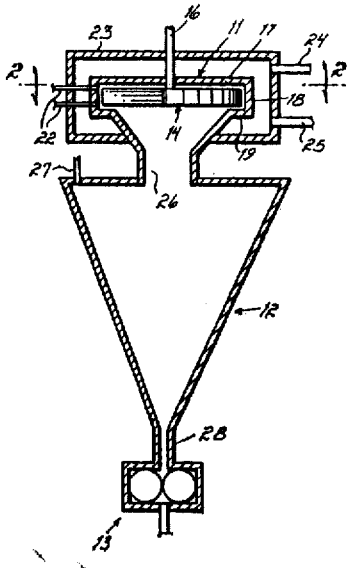

plete; and (5) permitting the intimately mixed reactant solutions to complete their reaction in the holdup area with no further agitation.

Apparatus including a mixing chamber with a high speed impeller, and including reactant inlets, a holding tank, and a connector between the mixing chamber and holdup tank that is preferably adapted to provide plug flow between the chamber and the tank. The plug flow is created by contraction of the discharge from the mixing chamber opening into the holding tank to produce a back pressure. The discharge from the holding tank is connected to a metering pump for delivering the continuously formed spandex dope to one or more fiber spinning machines.

July 15, 1969 W. M. McSPADDEN, JR., ET AL DEF. PUB.

METHOD AND APPARATUS FOR CONTINUOUSLY PRODUCING SPINNING DOPES OF SPANDEX POLYMERS

Filed Nov. 20, 1968

William M. McSpadden, Jr.
Frederick W. Volgt, Jr.
INVENTORS

BY William T. French
Charles L. Good
ATTORNEYS